US012384986B2

(12) United States Patent
Gao et al.

(10) Patent No.: US 12,384,986 B2
(45) Date of Patent: Aug. 12, 2025

(54) ACIDIC CLEANING COMPOSITIONS FOR ENHANCED SOIL REMOVAL

(71) Applicant: ECOLAB USA INC., Saint Paul, MN (US)

(72) Inventors: Jinsen Gao, Shanghai (CN); Yan Zheng, Shanghai (CN); Liang Ji, Shanghai (CN)

(73) Assignee: ECOLAB USA INC., Saint Paul, MN (US)

( * ) Notice: Subject to any disclaimer, the term of this patent is extended or adjusted under 35 U.S.C. 154(b) by 638 days.

(21) Appl. No.: 17/309,169

(22) PCT Filed: Nov. 21, 2019

(86) PCT No.: PCT/US2019/062534

§ 371 (c)(1),
(2) Date: May 3, 2021

(87) PCT Pub. No.: WO2020/106918

PCT Pub. Date: May 28, 2020

(65) Prior Publication Data

US 2021/0371775 A1 Dec. 2, 2021

(30) Foreign Application Priority Data

Nov. 22, 2018 (CN) ........................ 201811398827.7

(51) Int. Cl.
*C11D 1/72* (2006.01)
*C11D 1/825* (2006.01)
(Continued)

(52) U.S. Cl.
CPC ................ *C11D 3/042* (2013.01); *C11D 1/72* (2013.01); *C11D 1/8255* (2013.01); *C11D 3/32* (2013.01);
(Continued)

(58) Field of Classification Search
CPC ........... C11D 1/72; C11D 1/722; C11D 3/042; C11D 3/32
(Continued)

(56) References Cited

U.S. PATENT DOCUMENTS 3,668,137 A 6/1972 Gardner
3,752,169 A 8/1973 Rauch, Jr. et al.
(Continued)

FOREIGN PATENT DOCUMENTS

CN 1860256 A 11/2006
CN 101463293 A 6/2009
(Continued)

OTHER PUBLICATIONS

CLARIANT website, "GlucoPure Wet", 1 page, https://www.clariant.com/en/Solutions/Products/2014/10/30/16/31/GlucoPure-Wet?p=1 Sep. 24, 2018.
(Continued)

*Primary Examiner* — Gregory R Delcotto
(74) *Attorney, Agent, or Firm* — McKee, Voorhees & Sease, PLC

(57) ABSTRACT

Concentrated nitric acid cleaners employing the use of ethoxylated fatty alcohols, including a blend of polyethoxylated fatty alcohols, provide enhanced cleaning on metal and other surfaces, particularly stainless steel. Methods of use, including enhanced fatty soil removal and organic soil removal (such as soap scum) are also disclosed.

15 Claims, 4 Drawing Sheets

(51) Int. Cl.

| | |
|---|---|
| ***C11D 3/04*** | (2006.01) |
| ***C11D 3/20*** | (2006.01) |
| ***C11D 3/32*** | (2006.01) |
| ***C23G 1/08*** | (2006.01) |
| *C11D 1/66* | (2006.01) |
| *C11D 1/722* | (2006.01) |

(52) U.S. Cl.
CPC ................ *C23G 1/085* (2013.01); *C11D 1/66* (2013.01); *C11D 1/722* (2013.01); *C11D 2111/16* (2024.01)

(58) Field of Classification Search
USPC ................ 510/234, 238, 421, 422, 433, 501
See application file for complete search history.

(56) References Cited

U.S. PATENT DOCUMENTS

| | | | | |
|---|---|---|---|---|
| 3,887,488 | A | 6/1975 | Scott et al. | |
| 4,154,791 | A | 5/1979 | Howells et al. | |
| 4,356,148 | A | 10/1982 | Kagawa et al. | |
| 4,539,140 | A | 9/1985 | Quinlan | |
| 5,514,293 | A | 5/1996 | Shimakura et al. | |
| 5,688,755 | A | 11/1997 | Ikeda et al. | |
| 5,716,922 | A | 2/1998 | Curry et al. | |
| 6,200,947 | B1 | 3/2001 | Takashima et al. | |
| 6,218,349 | B1 | 4/2001 | Kravitz et al. | |
| 6,472,358 | B1 | 10/2002 | Richter et al. | |
| 6,540,943 | B1 | 4/2003 | Treybig et al. | |
| 6,617,290 | B2 | 9/2003 | Lopes | |
| 6,953,772 | B2 | 10/2005 | Lopes | |
| 7,494,963 | B2 | 2/2009 | Ahmed et al. | |
| 7,501,027 | B2 | 3/2009 | Ahmed et al. | |
| 8,178,236 | B2 | 5/2012 | Kim | |
| 8,618,037 | B2 | 12/2013 | Schacht et al. | |
| 8,623,805 | B2 | 1/2014 | Schacht et al. | |
| 2002/0039981 | A1 | 4/2002 | Lopes | |
| 2002/0058601 | A1 | 5/2002 | Jordan, IV et al. | |
| 2002/0192166 | A1 | 12/2002 | Steer | |
| 2003/0235623 | A1 | 12/2003 | Van Oosterom | |
| 2004/0074873 | A1 | 4/2004 | Kool et al. | |
| 2004/0163671 | A1 | 8/2004 | Fournel et al. | |
| 2005/0137107 | A1 | 6/2005 | Griese et al. | |
| 2006/0035808 | A1 | 2/2006 | Ahmed et al. | |
| 2006/0046945 | A1 | 3/2006 | Herdt et al. | |
| 2006/0280810 | A1 | 12/2006 | Kross et al. | |
| 2007/0034606 | A1 | 2/2007 | Dietsche et al. | |
| 2008/0015134 | A1 | 1/2008 | Ahmed et al. | |
| 2008/0319070 | A1 | 12/2008 | Kany et al. | |
| 2012/0172277 | A1 | 7/2012 | Schacht et al. | |
| 2013/0000681 | A1 | 1/2013 | Johnson et al. | |
| 2016/0186100 | A1* | 6/2016 | Im ........................ | C11D 3/2086 134/28 |
| 2016/0338929 | A1 | 11/2016 | Zasloff | |
| 2017/0071846 | A1 | 3/2017 | Schelges et al. | |
| 2017/0369821 | A1* | 12/2017 | Im .......................... | C23G 1/088 |
| 2021/0235700 | A1* | 8/2021 | Albright ................ | A01N 33/12 |

FOREIGN PATENT DOCUMENTS

| | | | | |
|---|---|---|---|---|
| CN | 101492824 A | 7/2009 | | |
| CN | 101831362 A | 9/2010 | | |
| CN | 103320238 A | 9/2013 | | |
| CN | 105132198 A | 12/2015 | | |
| CN | 105861178 A | 8/2016 | | |
| CN | 106085628 A | 11/2016 | | |
| CN | 106087407 A | 11/2016 | | |
| CN | 106467729 A | 3/2017 | | |
| CN | 107261854 A | 10/2017 | | |
| CN | 107841757 A | 3/2018 | | |
| DE | 102005026409 A1 | 12/2006 | | |
| EP | 0617144 A1 | 9/1994 | | |
| EP | 1263918 B1 | 12/2002 | | |
| EP | 1311653 B1 | 5/2003 | | |
| EP | 1561801 A1 | 8/2005 | | |
| EP | 1693437 A1 | 8/2006 | | |
| GB | 917432 | 2/1963 | | |
| JP | 2006124627 A | 5/2006 | | |
| KR | 100305693 B1 | 2/1999 | | |
| KR | 100328057 B1 | 5/1999 | | |
| KR | 100696928 B1 | 7/2001 | | |
| WO | 9301332 A1 | 1/1993 | | |
| WO | 9305132 A1 | 3/1993 | | |
| WO | 9412609 A1 | 6/1994 | | |
| WO | 9412610 A1 | 6/1994 | | |
| WO | 9533034 A1 | 12/1995 | | |
| WO | 9612832 A1 | 5/1996 | | |
| WO | 9638238 A1 | 12/1996 | | |
| WO | 0170921 A3 | 9/2001 | | |
| WO | 0210325 A1 | 2/2002 | | |
| WO | 2005073359 A1 | 8/2005 | | |
| WO | 2006020608 A3 | 2/2006 | | |
| WO | 2007017619 A1 | 2/2007 | | |
| WO | 2007050291 A1 | 5/2007 | | |
| WO | 2007128345 A1 | 11/2007 | | |
| WO | 2008022650 A1 | 2/2008 | | |
| WO | 2009059630 A1 | 5/2009 | | |
| WO | 2012093372 A2 | 7/2012 | | |
| WO | WO-2016179009 A1 * | 11/2016 | ............... | C11D 1/66 |
| WO | 2017066510 A1 | 4/2017 | | |
| WO | WO-2017177016 A1 * | 10/2017 | ............. | A01N 25/02 |

OTHER PUBLICATIONS

"Clariant Genapol UD 110", Safety Data Sheet, SXR023977, issued on May 12, 2015.
Ecolab, "Horolith LT", Product Ad, 2 pages, Mar. 28, 2014.
International Searching Authority in connection with PCT/US2019/062534 filed Nov. 21, 2019, "The International Search Report and the Written Opinion of the International Searching Authority, or the Declaration", 15 pages, mailed Mar. 5, 2020.

* cited by examiner

| Coupon name | Original photo | Converted by Image J soft with the threshold method |
|---|---|---|
| Soiled coupon |  |  |
| Cleaned with Horolith NP |  |  |
| Cleaned with Formulation 0224A |  |  |

ACIDIC CLEANING COMPOSITIONS FOR ENHANCED SOIL REMOVAL

CROSS REFERENCE TO RELATED APPLICATIONS

This is a U.S. national phase application claiming priority to PCT/US2019/062534, filed Nov. 21, 2019, which claims priority to Chinese application No. 201811398827.7, filed Nov. 22, 2018, the entire contents of which are hereby incorporated by reference in their entirety.

FIELD OF THE INVENTION

Concentrated nitric acid cleaning compositions employing the use of ethoxylated fatty alcohols provide stable compositions with enhanced cleaning on metal and other surfaces, particularly stainless steel. In particular, highly concentrated nitric acid cleaning compositions employing a blend of polyethoxylated fatty alcohols and in some embodiments a nonionic glucamide surfactant provide enhanced cleaning on metal and other surfaces. The compositions having at least 30% active or preferably at least 40% active nitric acid and surfactant blends are beneficially stable formulations. Methods of use, including enhanced fatty soil removal and soap scum removal are also disclosed, in particular for clean-in-place (CIP) applications.

BACKGROUND OF THE INVENTION

Steel is the generic name for a group of ferrous metals, composed principally of iron, which have considerable durability and versatility. By the proper choice of carbon content, addition of alloying elements, and by suitable heat treatment, different kinds of steel can be made for various purposes and the use in industry of all kinds of steel is now quite expansive. Stainless steel (SS) is a steel alloy that does not stain, corrode, or rust as easily as traditional steel. There are over 150 different grades and surface finishes to allow the stainless steel to suit the environment in which it will be used. Stainless steel's low maintenance and relatively low cost make it an ideal base material for many commercial applications, including for example cookware, hardware, instruments, appliances, industrial equipment, food and beverage processing industry equipment, and many other surfaces.

Cleaning of stainless steel includes the removal of various surface contaminants to ensure corrosion resistance, to prevent contamination, and to achieve the desired appearance of the steel. Acid cleaning is a process by which a solution of a mineral and/or organic acid in water sometimes in combination with a wetting agent or detergent or both, is employed to remove iron and other metallic contamination, light oxide films, soil and similar contaminants. Acid cleaning compositions for removing contaminants from stainless steel generally have the mineral or organic acid in a solution with a pH of less than 7.0. The compositions can remove both organic and inorganic soils in the same operation. They also are used to improve corrosion resistance and enhance brightness or gloss of the base metal surface.

Most acid cleaners also include a corrosion inhibitor of some sort. For example, in acid media copper sulfate has been used as a corrosion inhibitor. However these inhibitors are not entirely satisfactory since, like copper sulfate, they may be expensive, introduce an effluent disposal problem and, moreover, are not entirely effective. A variety of compounds, including dialkylthioureas, such as diethylthiourea and dibutylthiourea, are known to reduce the corrosivity of sulfuric acid to carbon steels. However, thioureas are not desirable for food and beverage applications.

The type of acid used has also presented problems in development of acid cleaners. Many acid cleaners are based upon phosphoric acid due to its diverse functionality such as a low corrosion profile on many alloys and elastomers, good mineral solubility and good soil suspension properties. Phosphoric acid continues to have more strict effluent regulations due to the phosphorus environmental and drinking water issues. It is therefore an object of this disclosure to provide a phosphorus free cleaning composition.

It is another object of this disclosure to provide aqueous, nitric based acid cleaning compositions which can be used on various surfaces to provide enhanced fatty soil removal and soap scum removal, which are particularly suitable for CIP and COP applications.

It is another object of this disclosure to provide aqueous, concentrated nitric based acid cleaning compositions which provide phase stability across high temperatures without causing phase separation and/or loss of activity during storage.

Other objects, aspects and advantages of this invention will be apparent to one skilled in the art in view of the following disclosure, the drawings, and the appended claims.

SUMMARY OF THE INVENTION

An advantage of the compositions and methods of using the acidic cleaning compositions is that enhanced fatty soil removal and soap scum removal are provided. Moreover, the acidic cleaning compositions are stable at high temperatures and for extended shelf-stability.

In an embodiment aqueous acidic cleaning compositions comprise: at least about 30% active aqueous nitric acid; about 20 wt-% to about 80 wt-% water; and at least one of (A) about 0.01 wt-% to about 1 wt-% of at least two polyethoxylated fatty alcohols having different molecular masses and/or (B) about 0.01 wt-% to about 0.5 wt-% nonionic glucamide co-surfactant. The compositions can further include at least about 40% active of the cleaning composition. The compositions can further include polyethoxylated fatty alcohols comprising at least one C12-C15 ethoxylated alcohol mixture with an average of 7-12 moles of ethoxylation. The compositions can further include polyethoxylated fatty alcohols that are a blend of two C12-C15 ethoxylated alcohol mixtures with an average of 7-12 moles of ethoxylation, including wherein the first polyethoxylated fatty alcohol is a C12-C14 mixture of ethoxylated alcohol with an average of 12 moles ethoxylation, and wherein the second polyethoxylated fatty alcohol is a C12-C15 mixture of ethoxylated alcohol with an average of 7 moles ethoxylation. The compositions can further include (or alternatively include) a nonionic glucamide co-surfactant, including a capryloyl/capryl methyl glucamide.

In a further embodiment, the cleaning compositions can have a ratio of polyethoxylated fatty alcohol (wt-%) to nitric acid (% active) between about 1:2000 to about 1:800 when the nitric acid concentration is less than about 50 wt-%, and between about 1:20 to about 1:300 when the nitric acid concentration is greater than or equal to about 50% active. In further embodiments, the composition is in a concentrated form that may be diluted to a use cleaning solution concentration. In embodiments, the compositions does not include additional surfactants and/or acids. In particular embodiments, the composition does not include alkylpolyglucoside and/or sulfuric based acids. Preferably, the composition is phosphate-free, sulfuric-free and sulphate-free. In additional embodiments, the compositions can also include at least one additional functional ingredient comprising defoaming agents, anti-redeposition agents, bleaching agents, solubility modifiers, dispersants, rinse aids, metal protecting agents, stabilizing agents, corrosion inhibitors, sequestrants and/or chelating agents, fragrances and/or dyes, rheology and/or solubility modifiers or thickeners, hydrotropes or couplers, buffers, and/or solvents.

In embodiments, the compositions are phase stable and retain surfactant stability measured by less than 10% change in IFT at temperatures from about 4° C. to about 40° C. for at least about three months.

Methods of cleaning soils are also included and comprise: applying any one of the cleaning compositions to a soiled surface or object; and removing soils from the surface. The soils can include organic soils, fats and/or soap scum. The surface or object can include stainless steel. According to embodiments of the methods of cleaning can have a temperature for the contacting step up to approximately 200 degrees Fahrenheit. In embodiments, the surfaces can include industrial equipment, a clean in place process and/or a clean out of place process, and can be applied in a CIP or COP application.

In embodiments, the cleaning compositions are applied to the surface or object for at least about 10 minutes and provides between about 5000 ppm to about 40,000 ppm total actives of the cleaning composition.

While multiple embodiments are disclosed, still other embodiments will become apparent to those skilled in the art from the following detailed description, which shows and describes illustrative embodiments. Accordingly, the drawings and detailed description are to be regarded as illustrative in nature and not restrictive.

Figure 1:
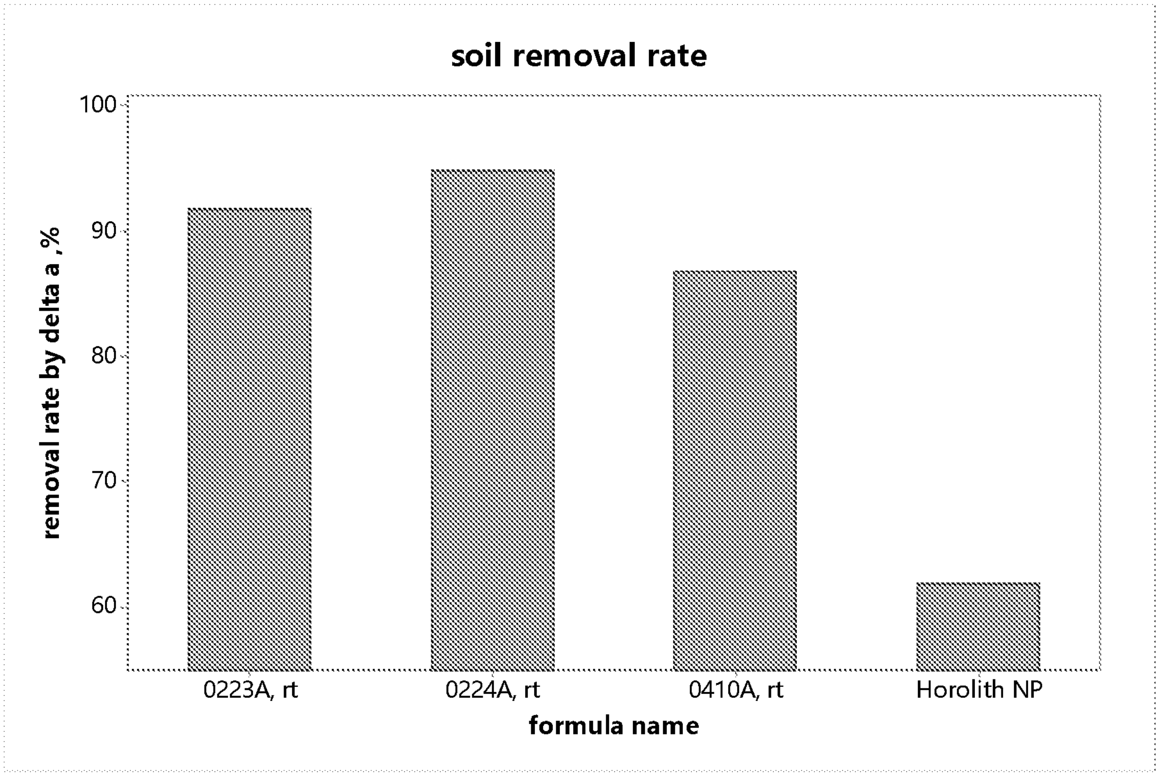
FIG. 1 shows soil removal efficacy of evaluated acidic cleaning compositions in comparison to a commercially-available acidic cleaning composition.

Various embodiments of the present invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION OF THE PREFERRED EMBODIMENTS

The embodiments are not limited to particular acidic cleaning compositions and CIP/COP methods of use thereof, which can vary and are understood by skilled artisans. Applicants have found, surprisingly, that the combination of polyethoxylated fatty alcohol surfactants in a high nitric acid concentration provide an effective acid cleaning solution that works well to remove difficult fatty soils and soap scums and are suitable for use on a variety of surfaces, including stainless steel.

It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form. Numeric ranges recited within the specification are inclusive of the numbers within the defined range. Throughout this disclosure, various aspects are presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range (e.g. 1 to 5 includes 1, 1.5, 2, 2.75, 3, 3.80, 4, and 5).

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments without undue experimentation, but the preferred materials and methods are described herein. In describing and claiming the embodiments, the following terminology will be used in accordance with the definitions set out below.

The term "about," as used herein, refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities.

The term "actives" or "percent actives" or "percent by weight actives" or "actives concentration" are used interchangeably herein and refers to the concentration of those ingredients involved in cleaning expressed as a percentage minus inert ingredients such as water or salts.

As used herein, the term "cleaning" refers to a method used to facilitate or aid in soil removal, bleaching, microbial population reduction, and any combination thereof.

As used herein, the term "microorganism" refers to any noncellular or unicellular (including colonial) organism. Microorganisms include all prokaryotes. Microorganisms include bacteria (including cyanobacteria), spores, lichens, fungi, protozoa, virinos, viroids, viruses, phages, and some algae. As used herein, the term "microbe" is synonymous with microorganism. For the purpose of this patent application, successful microbial reduction is achieved when the microbial populations are reduced by at least about 50%, or by significantly more than is achieved by a wash with water. Larger reductions in microbial population provide greater levels of protection.

As used herein, the term "free" (such as "phosphorus-free", "sulfuric-free" and "sulphate-free") refers to compositions completely lacking the component or having such a small amount of the component that the component does not affect the performance of the composition. The component may be present as an impurity or as a contaminant and shall be less than 0.5 wt-%. In another embodiment, the amount of the component is less than 0.1 wt-% and in yet another embodiment, the amount of component is less than 0.01 wt-%.

As used herein, the term "phosphorus-free" refers to a composition, mixture, or ingredient that does not contain phosphorus or a phosphorus-containing compound or to which phosphorus or a phosphorus-containing compound has not been added. Should phosphorus or a phosphorus-containing compound be present through contamination of a phosphorus-free composition, mixture, or ingredients, the amount of phosphorus shall be less than 0.5 wt. %. More preferably, the amount of phosphorus is less than 0.1 wt-%, and most preferably the amount of phosphorus is less than 0.01 wt. %.

As used herein, the term "sulfuric-free" and "sulphate-free" refer to a composition, mixture, or ingredient that does not contain sulfuric based acids or sulphates, respectively. Should sulfuric based acids or sulphates be present through contamination of a composition, mixture, or ingredients, the amount of sulfuric based acids or sulphates shall be less than 0.5 wt. %. More preferably, the amount of sulfuric based acids or sulphates is less than 0.1 wt-%, and most preferably the amount of phosphorus is less than 0.01 wt. %. Without being limited to a particular mechanism of action as the acidic cleaning compositions are particularly well suited for cleaning high calcium soils (such as at least 2000 ppm, at least 2500 ppm, or even 3000 ppm calcium or greater) the exclusion of sulfuric based acids and sulphates ensures calcium sulphate does not form and/or precipitate.

The term "surfactant" or "surface active agent" refers to an organic chemical that when added to a liquid changes the properties of that liquid at a surface.

The term "weight percent," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

The methods and compositions may comprise, consist essentially of, or consist of the components and ingredients as well as other ingredients described herein. As used herein, "consisting essentially of" means that the methods and compositions may include additional steps, components or ingredients, but only if the additional steps, components or ingredients do not materially alter the basic and novel characteristics of the claimed methods and compositions.

Acidic Cleaning Compositions

According to embodiments, the acidic cleaning compositions include a high concentration of at least 30 wt-% nitric acid. The acidic cleaning compositions include one or more of polyethoxylated fatty alcohols, including a mixture of C12-C15 ethoxylated alcohols with an average of 7-12 moles of ethoxylation, and a nonionic co-surfactant, including a glucamide. The acidic cleaning compositions can include additional functional ingredients. Exemplary concentrated acidic cleaning compositions are shown in Tables 1-3 each in weight percentage. Such exemplary acidic cleaning compositions are beneficially phosphate-free, sulfuric acid-free, and/or sulphate-free.

TABLE 1

| Material | First Exemplary Range wt.-% | Second Exemplary Range wt.-% | Third Exemplary Range wt.-% |
|---|---|---|---|
| Nitric Acid | 40-95 | 50-90 | 60-90 |
| Polyethoxylated fatty alcohol(s) | 0.01-1 | 0.015-1 | 0.1-0.5 |
| Non-ionic Co-surfactant (glucamides) | 0.01-0.5 | 0.015-0.5 | 0.1-0.5 |
| Water | 20-80 | 30-80 | 40-80 |
| Additional Functional Ingredients | 0-90 | 0-75 | 0-50 |

TABLE 2

| Material | First Exemplary Range wt.-% | Second Exemplary Range wt.-% | Third Exemplary Range wt.-% |
|---|---|---|---|
| Nitric Acid | 40-95 | 50-90 | 60-90 |
| Polyethoxylated fatty alcohol(s) | 0.01-1 | 0.015-1 | 0.1-0.5 |
| Water | 20-80 | 30-80 | 40-80 |
| Additional Functional Ingredients | 0-90 | 0-75 | 0-50 |

TABLE 3

| Material | First Exemplary Range wt.-% | Second Exemplary Range wt.-% | Third Exemplary Range wt.-% |
|---|---|---|---|
| Nitric Acid | 40-95 | 50-90 | 60-90 |
| Non-ionic Co-surfactant (glucamides) | 0.01-0.5 | 0.015-0.5 | 0.1-0.5 |
| Water | 20-80 | 30-80 | 40-80 |
| Additional Functional Ingredients | 0-90 | 0-75 | 0-50 |

The acidic cleaning compositions may include concentrate compositions or may be diluted to form use compositions. In general, a concentrate refers to a composition that is intended to be diluted with water to provide a use solution that contacts an object to provide the desired cleaning. The acidic cleaning composition that contacts the surface or object to be cleaned can be referred to as a concentrate or a use composition (or use solution) dependent upon the formulation employed in methods according to the invention.

Nitric Acid

The acidic cleaning compositions include a high concentration of nitric acid. Nitric acid is an inorganic acid formed by catalytically oxidizing ammonia with air to form nitrogen dioxide. When the nitrogen dioxide is dissolved in water, 60% nitric acid is formed. $3NO_2+H_2O\rightarrow 2HNO_3+NO$. It has the condensed structural formula $HNO_3$.

According to aspects of the invention and the acidic cleaning composition, nitric acid provides an acidic pH for the cleaning composition. The nitric acid further provides the benefit of being a corrosion inhibitor. It has been surprisingly found that at an actives percentage of at least about 30%, at least about 40%, or greater of nitric acid with blends of surfactants disclosed herein provide a stable aqueous acid cleaning composition that works surprisingly well at removing soils from surfaces.

Typical acid cleaners contain from about 1 to about 30, or about 15 to about 25 weight percent of an acid or blends of acids, such as sulfuric acid and are diluted prior to application to a surface in need of cleaning. The cleaning compositions disclosed herein can be provided at high concentrations nitric acid (at least about 40 wt-% to 95 wt-%, at least about 50 wt-% to 90 wt-%, or at least about 60 wt-% to 90 wt-% nitric acid; or at least 30% active, at least 40% active, or greater of nitric acid) and can be diluted to provide between about 0.1 to about 4%, or about 0.5 to about 3.5% nitric acid in a use solution. In some embodiments, nitric acid is included in the acidic cleaning compositions at an amount of at least about 40 wt-% to about 95 wt-%, about 40 wt-% to about 90 wt-%, about 40 wt-% to about 80 wt-%, about 50 wt-% to about 90 wt-%, or about 60 wt-% to about 90 wt-%. Weight percentage ranges disclosed herein are intended to include ranges of nitric acid actives based on concentrate nitric acid commercially-available. Nitric acid can be commercially-available at various ranges. Most often nitric acid (70%) is commercially-available. Accordingly a skilled artisan can determine the percent active nitric acid based on the range of weight percentage and the concentrate active nitric acid employed in a formulation of the acidic cleaning composition. In a preferred embodiment, nitric acid is the only acid included in the cleaning composition. In a preferred embodiment, the cleaning composition does not include sulfuric acid (sulphuric acid).

In some embodiments, the compositions can be produced by first mixing water and nitric acid, by either batch or continuous processes, to which the surfactants are later added.

Polyethoxylated Fatty Alcohol Surfactants

The acidic cleaning compositions preferably include at least one polyethoxylated fatty alcohol. Polyethoxylated fatty alcohols are nonionic alcohol ethoxylates. The nonionic alcohol ethoxylate can also be alkylphenol ethoxylates, preferably fatty alcohol polyoxyethylene ether and/or fatty alcohol polyoxyethlene nonylphenol ether surfactants. Exemplary commercially-available polyethoxylated fatty alcohols include AEO-7 (mixture of C12-C15 ethoxylated alcohols with an average of 7 moles of ethoxylation) and AEO-12 (mixture of C12-C14 ethoxylated alcohols with an average of 12 moles of ethoxylation). The nonionic alcohol ethoxylates can also include ethoxylated oxoalcohols, including C11-oxoalcohol, ethoxylated.

In an embodiment, at least one of the polyethoxylated fatty alcohols include AEO-7 (mixture of C12-C15 ethoxylated alcohols with an average of 7 moles of ethoxylation) or AEO-12 (mixture of C12-C14 ethoxylated alcohols with an average of 12 moles of ethoxylation). In a preferred embodiment, the polyethoxylated fatty alcohols include a combination of both AEO-7 (mixture of C12-C15 ethoxylated alcohols with an average of 7 moles of ethoxylation) and AEO-12 (mixture of C12-C14 ethoxylated alcohols with an average of 12 moles of ethoxylation). It has been surprisingly found that the combination of polyethoxylated fatty alcohols of differing molecular masses formulated at a high concentration of nitric acid beneficially provide a stable concentrated acidic cleaning composition. Without being limited to a particular mechanism of action or theory of the invention, although an acidic cleaning composition containing a single polyethoxylated fatty alcohol provides surfactant detergency for efficacious cleaning, the combination of polyethoxylated fatty alcohols ensures the concentrated composition is not cloudy and does not phase separate while providing improved storage and transportation temperature stability, including low temperature stability of at least about 4° C.

As referred to herein, 'temperature stability' means an aqueous acidic cleaning composition that is not cloudy and does not phase separate at temperatures from about 4° C. to about 40° C. for at least about three months and maintains surfactant stability within the composition. As referred to herein, surfactant stability is measured by IFT (as set forth in the Examples) and is less than a 10% change in IFT at temperatures from about 4° C. to about 40° C. for at least about three months. Beneficially, the acidic cleaning compositions provide temperature stable compositions where surfactant stability is retained when employing the least one polyethoxylated fatty alcohols and/or glucamides.

The acidic cleaning compositions contain surfactants in order to provide desired cleaning effect, and to ensure satisfactory wetting of the surfaces being treated with the acid cleaning composition. Although a surfactant concentration can be directly to a treatment solution, it is preferred to add them to the concentrate used in producing the use solution of the acidic cleaning composition. In some embodiments, polyethoxylated fatty alcohols are included in the acidic cleaning compositions at an amount of at least about 0 wt-% to about 1 wt-%, preferably about 0.01 wt-% to about 1 wt-%, about 0.015 wt-% to about 1 wt-%, about 0.05 wt-% to about 1 wt-%, about 0.1 wt-% to about 1 wt-%, or about 0.1 wt-% to about 0.5 wt-%.

In some embodiments, the C12-C14 ethoxylated alcohols with an average of 12 moles of ethoxylation are included in the acidic cleaning compositions at an amount of at least about 0.01 wt-% to about 1 wt-%, about 0.05 wt-% to about 1 wt-%, about 0.05 wt-% to about 0.5 wt-%, or about 0.05 wt-% to about 0.2 wt-%, and the C12-C15 ethoxylated alcohols with an average of 7 moles of ethoxylation are included in the acidic cleaning compositions at an amount of at least about 0.05 wt-% to about 1 wt-%, about 0.05 wt-% to about 0.5 wt-%, or about 0.1 wt-% to about 0.5 wt-%.

In additional embodiments, the amount or concentration of polyethoxylated fatty alcohols is dependent upon the concentration of the nitric acid. For cleaning compositions having nitric acid concentration less than about 50% actives the ratio of the AEO-12 ethoxylated alcohols with an average of 12 moles of ethoxylation (wt-%) to nitric acid (actives %) is about 1:2000 to about 1:200, whereas if nitric acid concentration is equal to or greater than about 50% active the ratio of the AEO-12 ethoxylated alcohols with an average of 12 moles of ethoxylation (wt-%) to nitric acid (% active) is about 1:20 to about 1:300.

Nonionic Co-Surfactants

The acidic cleaning compositions preferably include a nonionic co-surfactant. In an embodiment, the nonionic co-surfactant is a low foaming glucamide. Glucamides include N-acyl N-alkyl derivatives of glucosamine (also referred to as glucamides, GA, fatty acid glucamide, or FAGA). An exemplary glucamide is Capryloyl/Capryl Methyl Glucamide, commercially-available as Glucopure WET™ from Clariant.

Preferably, the glucamide surfactants are included the acidic cleaning composition instead of nonionic alkyl polysaccharide surfactants.

In some embodiments, nonionic co-surfactants, preferably the glucamides, are included in the acidic cleaning compositions at an amount of at least about 0 wt-% to about 1 wt-%, about 0.01 wt-% to about 1 wt-%, about 0.01 wt-% to about 0.5 wt-%, about 0.015 wt-% to about 0.5 wt-%, about 0.1 wt-% to about 0.5 wt-%.

Additional Functional Ingredients

The components of the acidic cleaning composition can further be combined with various functional components suitable for uses disclosed herein, including hard surface cleaning, CIP and COP applications. In some embodiments, the acidic cleaning composition including the nitric acid, water, polyethoxylated fatty alcohols and/or nonionic glucamide co-surfactant make up a large amount, or even substantially all of the total weight of the acidic cleaning composition. For example, in some embodiments few or no additional functional ingredients are disposed therein.

In other embodiments, additional functional ingredients may be included in the acidic cleaning compositions. The functional ingredients provide desired properties and functionalities to the compositions. For the purpose of this application, the term "functional ingredient" includes a material that when dispersed or dissolved in a use and/or concentrate solution, such as an aqueous solution, provides a beneficial property in a particular use. Some particular examples of functional materials are discussed in more detail below, although the particular materials discussed are given by way of example only, and that a broad variety of other functional ingredients may be used. For example, many of the functional materials discussed below relate to materials used in cleaning. However, other embodiments may include functional ingredients for use in other applications.

In some embodiments, the acidic cleaning compositions may include defoaming agents, anti-redeposition agents, bleaching agents, solubility modifiers, dispersants, rinse aids, metal protecting agents, stabilizing agents, corrosion inhibitors, sequestrants and/or chelating agents, fragrances and/or dyes, rheology and/or solubility modifiers or thickeners, hydrotropes or couplers, buffers, solvents and the like.

According to embodiments of the invention, the various additional functional ingredients may be provided in a composition in the amount from about 0 wt-% and about 90 wt-%, from about 0 wt-% and about 75 wt-%, from about 0 wt-% and about 50 wt-%, from about 0.01 wt-% and about 50 wt-%, from about 0.1 wt-% and about 50 wt-%, from about 1 wt-% and about 50 wt-%, from about 1 wt-% and about 30 wt-%, from about 1 wt-% and about 25 wt-%, or from about 1 wt-% and about 20 wt-%. In addition, without being limited according to the invention, all ranges recited are inclusive of the numbers defining the range and include each integer within the defined range.

In a preferred embodiment, urea is preferably included as a hydrotrope or solubility modifier for the acidic cleaning composition. In exemplary embodiments, urea is included in the acidic cleaning compositions in an amount from about 0.01 wt-% and about 10 wt-%, from about 0.05 wt-% and about 1 wt-%.

These and other additional functional ingredients may also be included including but not limited to wetting agents to lower solution surface tension, solvents to aid in the removal of hydrophobic soils, defoamers to prevent foam or foam buildup on solution surface, thickeners (acid stable) to allow the cleaner to adhere (cling to vertical surface), passivators to protect the surface from environmental attack, and biocides to control odor problems and kill harmful bacteria. Dyes and other components may also be added.

Aesthetic enhancing agents such as colorants and perfume are also optionally incorporated into the acidic cleaning compositions. Examples of perfumes or fragrances useful in the acidic cleaning compositions include but are not limited to liquid fragrances.

It should be understood that the water provided as part of the solution or concentrate of the acidic cleaning composition can be relatively free of hardness. It is expected that the water can be deionized to remove a majority of the dissolved solids in the water. The concentrate is then diluted with water available at the locale or site of dilution and that water may contain varying levels of hardness depending upon the locale. Although softened or deionized is preferred for formulating the concentrate, the concentrate can be formulated with water that has not been deionized. That is, the concentrate can be formulated with water that includes dissolved solids, and can be formulated with water that can be characterized as hard water.

Methods of Use

The acidic cleaning compositions are suited for cleaning hard surfaces and objects. The acidic cleaning compositions are efficacious in cleaning and removing soils from such surfaces and objects, including for example fatty and proteinaceous soils, organic soils, and films/foams that are left as residues on surfaces and objects, such as from CIP processes. In a particular embodiment, the acidic cleaning compositions are efficacious in removing calcium stearate and other soap scum soils from a surface.

In some aspects, the acidic cleaning compositions are particularly well-suited for clean-in-place (CIP) and clean-out-of-place (COP) applications. CIP applications include those where the acidic cleaning composition is passed through the pipes without dissembling equipment. COP systems may include readily accessible systems including wash tanks, soaking vessels, mop buckets, holding tanks, scrub sinks, vehicle parts washers, non-continuous batch washers and systems, and the like. In some aspects, the acidic cleaning compositions are further suitable for removing mineral soils. For example, the acidic cleaning compositions may be used on stainless steel pipes which need to use acid cleaners to de-lime surfaces.

Exemplary industries in which the methods of the present invention can be applied include, but are not limited to: the food and beverage industry, e.g., the dairy, cheese, sugar, and brewery industries, including for example evaporator and pasteurizer cleaning, including ultra-high temperature (UHT) and high temperature short time (HTST) pasteurizers; oil processing industry; industrial agriculture and ethanol processing; and the pharmaceutical manufacturing industry.

In some aspects, the methods of using the acidic cleaning compositions include applying or contacting the compositions to equipment, e.g., industrial equipment, generally cleaned using clean in place cleaning procedures. Examples of such equipment include evaporators, heat exchangers (including tube-in-tube exchangers, direct steam injection, and plate-in-frame exchangers), heating coils (including steam, flame or heat transfer fluid heated) re-crystallizers, pan crystallizers, spray dryers, drum dryers, membranes and tanks.

Conventional CIP processes are generally well known. The process includes applying or circulating a water diluted solution of cleaning concentrate (typically about 0.5-3% by volume) onto the surface to be cleaned. The solution flows across the surface (3 to 6 feet/second) to remove the soil. Either new solution is re-applied to the surface, or the same solution is re-circulated and re-applied to the surface as required to achieve a clean soil-free surface.

A typical CIP process to remove a soil (including organic, inorganic or a mixture of the two components) often includes at least three steps: an initial water rinse or previously used chemical rinse, an alkaline and/or acid solution wash, and a final fresh water rinse. Additional steps may include a separate acid or alkaline wash as well as a separate sanitizing step. The alkaline solution softens the soils and removes the organic alkaline soluble soils. The acid solution removes any remaining mineral soils. The strength of the alkaline and acid solutions, the duration of the cleaning steps and the cleaning solution temperature are typically dependent on the amount and tenacity of the soil. The water rinse removes any residual chemical solution and soils prior to the equipment being returned on-line for production purposes.

The acidic cleaning compositions can be applied to surfaces using a variety of methods. These methods can operate on an object, surface, or the like, by contacting the object or surface with the composition. Contacting can comprise any of numerous methods for applying a liquid, such as spraying the compound, immersing the object in the compound, foam or gel treating the object with the compound, or a combination thereof. Without being limited to the contacting according to the invention, a concentrate or use liquid composition can be applied to or brought into contact with an object by any conventional method or apparatus for applying a liquid composition to an object. For example, the surface can be wiped with, sprayed with, foamed on, and/or immersed in the liquid compositions, or use liquid compositions made from the concentrated liquid compositions. The liquid compositions can be sprayed, foamed, or wiped onto a surface; the compound can be caused to flow over the surface, or the surface can be dipped into the compound. Contacting can be manual or by machine.

The acidic cleaning compositions are in contact with a surface or object for a sufficient amount of time to clean the surface or object. In an aspect, the surface or object is contacted with the acidic cleaning composition for at least about 1 minute, at least about 10 minutes, or between about 10 minutes and about 20 minutes. The acidic cleaning compositions can be applied at a use or concentrate solution to a surface or object in need of cleaning. In an aspect, a use concentration of the acidic cleaning composition includes from about 1000 ppm to about 50,000 ppm, or from about 5000 ppm to about 50,000 ppm, or from about 5000 ppm to about 40,000 ppm, including all ranges therebetween.

The acidic cleaning compositions can be applied at a use or concentrate solution pH between about <0 to about 2, or between about 0 and about 2, or preferably between about 0.5 and about 2. In a preferred aspect, the pH of a use concentration (i.e. diluted concentrate composition) is between about 0.5 and about 2. Without being limited to rate of dilution of the concentrate acidic cleaning composition, in some embodiments a concentrate can be diluted to about 0.1% to about 4% of the formulation, or from about 0.5% to about 4% of the formulation.

EXAMPLES

Embodiments of the present invention are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

The following ingredients are utilized in the Examples:

Glucopure WET—N—$C_{8-10}$-alkanoyl-n-methylglucamine, CAS 91782-62-5

AEO-7—linear alcohol 60-70% ethoxylate, 7EO

AEO-12—alcohol (C12-C14) 12EO

Genapol UD 110—$C_{11}$-oxo alcohol polyglycol ether with 11 mol EO

Luntensol XL89—Oxirane, 2-methyl-, polymer with oxirane, mono(2-propylheptyl) ether Tego XP 1075—low foaming anionic/amphoteric surfactant blend available from Evonik Industries AG

Example 1

Formulations as shown in Tables 4-5 were made according to the following steps: First water was added to mixer, and stirred. Urea was added and mixed to dissolve thoroughly. Nitric acid was added and mixed for 5 minutes before the remainder of components were added and mixed an additional 5 minutes.

TABLE 4

| | Sample code | | | | | | |
|---|---|---|---|---|---|---|---|
| | 0224A | 0306B | 0315A | 0316A<br>% | 0410A | 0223A | 0906A |
| Water Zeolite Softened TNK | 40.25 | 40.28 | 40.1 | 40.2 | 40.3 | 40.2 | 40.3 |
| Urea | 0.1 | 0.1 | 0.1 | 0.1 | 0.1 | 0.1 | 0.1 |
| Nitric Acid Tech (42 BE 67.2%; 67.2% active) TNK | 59.5 | 59.5 | 59.5 | 59.5 | 59.5 | 59.5 | 59.5 |
| Glucopure WET | | | 0.1 | 0.1 | | 0.1 | 0.1 |
| AEO-7 | 0.1 | 0.1 | | | | 0.05 | |
| AEO-12 | 0.05 | 0.02 | | | | 0.05 | |
| Genapol UD 110 | | | 0.2 | 0.1 | | | |
| Luntensol XL89 | | | | | 0.1 | | |

TABLE 5

| | Sample code | | | |
|---|---|---|---|---|
| | 0713A | 0713B | 0713C % | 0713D |
| Water Zeolite Softened TNK | 25.39 | 25.30 | 25.25 | 25.20 |
| Nitric Acid Tech (42 BE 67.2%) TNK | 74.4 | 74.4 | 74.4 | 74.4 |
| Urea | 0.1 | 0.1 | 0.1 | 0.1 |
| AEO-7 | 0.1 | 0.1 | 0.1 | 0.1 |
| AEO-12 | 0.01 | 0.10 | 0.15 | 0.2 |

The stability of the formulations were evaluated at 4° C., room temperature and 40° C. and the results are shown in Tables 6-7.

TABLE 6

| | Sample code | | | | | | |
|---|---|---|---|---|---|---|---|
| | 0224A | 0306B | 0315A | 0316A | 0410A | 0223A | 0906A |
| 4° C. | ok | ok | ok | ok | ok | ok | Settle-ment |
| RT | ok | ok | ok | ok | ok | ok | ok |
| 40° C. | ok | ok | ok | ok | ok | Cloudy | ok |

TABLE 7

| | Sample code | | | |
|---|---|---|---|---|
| | 0713A | 0713B | 0713C | 0713D |
| 4° C. | ok | ok | ok | ok |
| RT | cloudy | cloudy | ok | ok |
| 40° C. | separation | separation | cloudy | ok |

The stability results show that when nitric acid is increased in the formulations to 50% active in formulations evaluated in Table 5 (compared to 40% active for the formulations in Table 4), additional AEO-12 is needed to stabilize the formula. Formula with AEO-7 (0.1%), AEO-12 (0.2%) is stable, if AEO-12 less than 0.15%, cloudy or separation @40° C. The results confirm that the combination of ethoxylated fatty alcohol surfactants (AEO-7 and AEO-12 (also in combination with glucamide nonionic surfactant)) are stable at varying temperatures.

Example 2

Performance testing of the formulations were conducted to assess fat soil removal efficacy. A thin butterfat dairy soil (with Sudan red IV) was prepared and analyzed to assess ability to remove soils that are common in cold dairy applications. Most often when insufficient cleaning is observed in cold dairy applications it is no heavy soil that remains; instead thin films of fat and/or protein on the steel and gasket materials are observed. This can often be barely visible. This test reproduces the thin residues and compares performance of two formulations for removal of the soils.

Example 1 formulations from the room temperature stability samples were analyzed. Stainless steel coupons were soiled for cleaning test. Cleaning test conditions were 70° C., 350 RPM, 20 minutes. Test measurements of L, a, b were read on a HunterLab Color Quest Spectrophotometer to assess color test, and soil removal rate (%) was calculated by color readings. In this color space L* indicates lightness and a* and b* are measured of chromaticity, with +a* being the red direction, −a* the green direction, +B* the yellow direction, and −b* the blue direction. The results are reported as a change in the ab* value for a particular treatment. See HunterLab procedure for further details. The cleaning tests were only conducted for the formulations from Example 1 that passed stability test. They were further compared to a commercially-available acidic cleaning composition, Horolith NP (Ecolab, Inc.).

FIG. 1 shows the cleaning results shown in rate of soil removal (delta a %) showing formulations 0223A (nitric acid, ethoxylated fatty alcohols and glucamide nonionic surfactant) and 0224A (nitric acid and ethoxylated fatty alcohols) outperform 0410A (nitric acid and Lutensol XL89 formulation) and the commercial control of a nitric acid/urea formulation (Horolith NP, Ecolab Inc.). These results show overall improved performance for formulations including the ethoxylated fatty alcohols, including the AEO-7 and AEO-12 surfactants.

Example 3

Additional performance testing was conducted as outlined in Example 2 using the formulations from Example 1, 40° C. stability samples. Table 8 shows the data for FIG. 2. The number of days next to each formulation in Table 8 refers to how many days stability @40° C. when cleaning test was run. Delta a % refers to soil removal rate by delta. Soil removal rate=(a0−a)*100%/a0; a0=soiled coupon data; a=reading of cleaned coupon.

TABLE 8

| | | L | a | b | | delta a % |
|---|---|---|---|---|---|---|
| 0224A | 1 | 54.95 | 4.16 | 2.91 | 27.71 | 86.96 |
| (73 days) | 2 | 55.27 | 4.01 | 2.26 | 27.86 | 87.41 |
| | 3 | 57.55 | 5.91 | 3.70 | 25.96 | 81.47 |
| | 4 | 54.01 | 5.19 | 2.69 | 26.68 | 83.72 |
| 0223A | 1 | 54.44 | 8.68 | 3.75 | 23.19 | 72.76 |
| (74 days) | 2 | 50.03 | 6.98 | 3.67 | 24.89 | 78.11 |
| | 3 | 55.31 | 5.29 | 2.98 | 26.58 | 83.39 |
| | 4 | 49.41 | 7.61 | 3.84 | 24.26 | 76.11 |
| 0316A | 1 | 52.54 | 10.94 | 5.78 | 20.93 | 65.67 |
| (51 days) | 2 | 46.46 | 10.71 | 4.13 | 21.16 | 66.41 |
| | 3 | 56.55 | 6.56 | 3.58 | 25.31 | 79.42 |
| | 4 | 55.45 | 8.39 | 4.07 | 23.48 | 73.66 |
| 0906A | 1 | 54.83 | 9.66 | 4.51 | 22.21 | 69.69 |
| (8 months) | 2 | 49.62 | 12.01 | 5.49 | 19.86 | 62.32 |
| | 3 | 53.72 | 8.77 | 4.41 | 23.10 | 72.49 |
| | 4 | 51.84 | 11.11 | 5.55 | 20.76 | 65.15 |

Figure 2:
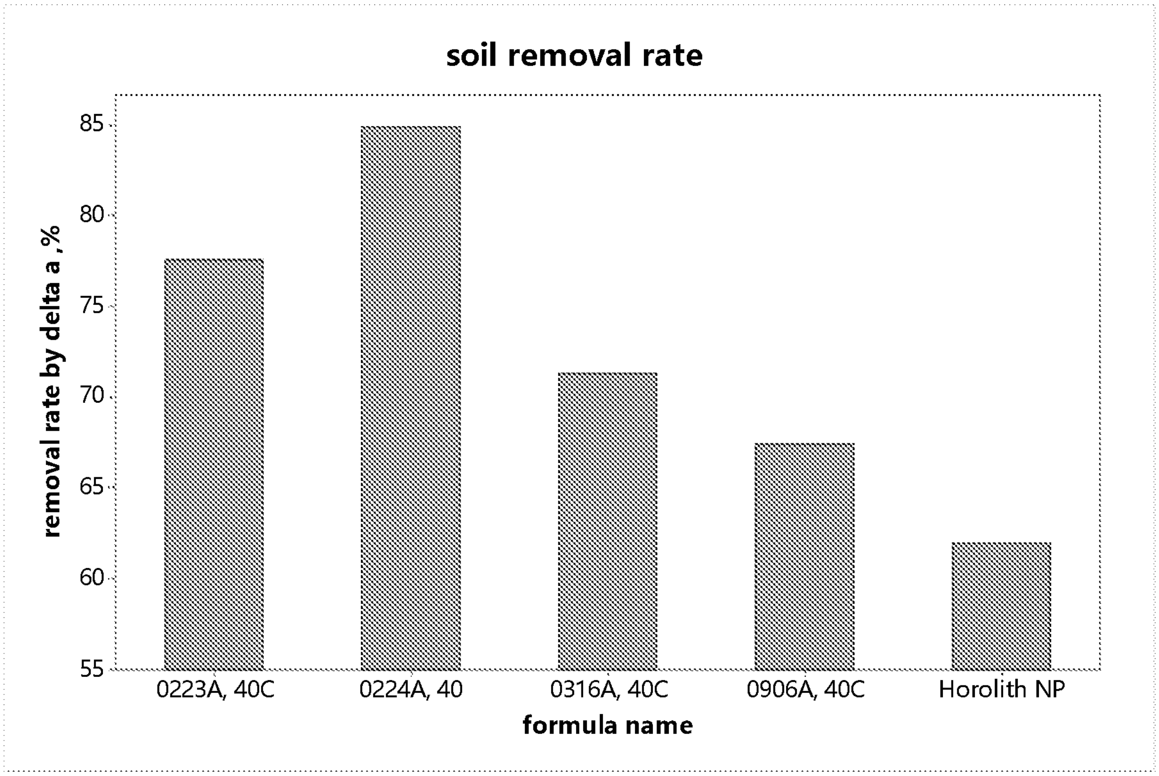
FIG. 2 shows soil removal efficacy of additional evaluated acidic cleaning compositions in comparison to a commercially-available acidic cleaning composition.

FIG. 2 shows the cleaning results shown in the average of 4 trials of the rate of soil removal (delta a %) showing formulations 0223A (nitric acid, ethoxylated fatty alcohol and glucamide nonionic surfactant formulation) and 0224A (nitric acid and ethoxylated fatty alcohol formulation) outperform the formulations with only the glucamide nonionic surfactant, including 0906A (nitric acid and glucamide nonionic formulation), 0316A (nitric acid and $C_{11}$-oxo alcohol polyglycol ether with 11 mol EO formulation) and the commercial control of a sulfuric acid/nitric acid formulation. The results confirm the surfactants are stable in the formulations as demonstrated by the maintained soil removal capability.

Example 4

Calcium oleate removal efficacy was analyzed according to the following methods (as provided by supplier, Clariant): A preparation of 250 g/$CaCl_2$ solution and 5% sodium oleate solution were prepared. The $CaCl_2$ solution was sprayed onto clean stainless steel (SS) coupons, and then the same amount of sodium oleate solution was sprayed onto SS coupons to form a uniform white film soil. These were allowed to sit for 4 hours at room temperature before being placed into a clean in place (CIP) solution for cleaning for 15 minutes. After cleaning, the coupons were removed and photo images were taken and the results were analyzed by Image J according to soil residue level.

Figure 5:
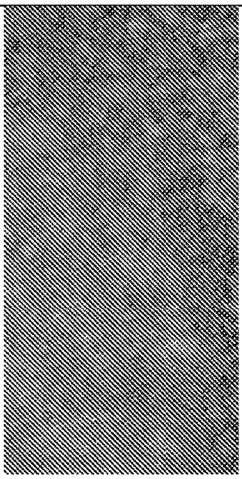
FIG. 5 shows photo image analysis that converts result to soil removal rate %.
Figure 5:
Figure 5:
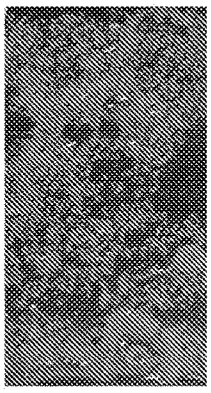
Figure 5:
Figure 5:
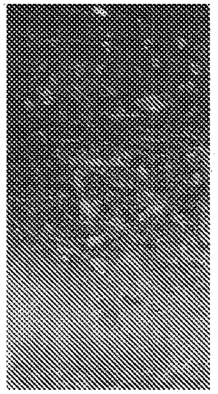
Figure 5:

The photo images are shown in FIG. 5. As depicted the black area in the converted image is clean area to more easily depict the cleaning efficacy of soil removal. The analytical results for the evaluated coupons are also shown in Table 9.

TABLE 9

| No. | coupon name | Area | Mean | StdDev | Min | Max | % Area (Clean) |
|---|---|---|---|---|---|---|---|
| 1 | soiled coupon | 720000 | 13.236 | 56.569 | 0 | 255 | 5.191 |
| 2 | 0224A cleaning | 720000 | 174.403 | 118.559 | 0 | 255 | 68.393 |
| 3 | Horolith NP cleaning | 720000 | 118.182 | 127.159 | 0 | 255 | 46.346 |

Formulation 0224A was evaluated against the commercial control of Horolith NP (nitric acid/urea formulation with out the ethoxylated fatty alcohol surfactants). The 0224A formulation removed substantially all of the calcium oleate soils whereas the control removed partial coverage of the calcium oleate. These results can be visualized according to FIG. 5 where the image analysis shows that 0224A cleans are greater area (and therefore removes more soil) than Horolith NP.

Example 5

Interfacial tension testing was conducted to assess the surfactant stability in the formulations disclosed herein. IFT (interfacial tension) was analyzed according to the Surface Tension and Contact Angle at room temperature as shown in Table 10.

TABLE 10

| IFT | Glucopure WET (new) | Glucopure WET (2 years, RT) | Tego XP 1075 (new) | Tego XP 1075 (2 years, RT) |
|---|---|---|---|---|
| | formula code/product name [mN/m] | | | |
| Concentrated | / | 29.16 ± 0.28 | / | 62.71 ± 1.78 |
| 3.00% | 49.38 ± 1.28 | 49.38 ± 0.28 | 46.6 ± 3.86 | 70.39 ± 0.00 |

The IFT of a new sample with Glucopure WET is close to that of 2 years old sample, indicating the Glucopure WET is stable at 40% nitric acid. The IFT of new sample with Tego XP 1075 is different from that of 2 years old sample, indicating the Tego XP 1075 cannot be used at 40% nitric acid formulation.

The formulations were also analyzed for surfactant stability in nitric acid formulations >40% as shown in Table 11. The control formulations of Horolith NP (nitric acid/urea), and Horolith LT (nitric acid/sulfuric acid with AEO-7) were evaluated.

TABLE 11

| | Horolith NP | Horolith LT | 0224A | 0306B | 0315A | 0410A | 0223A | 0906A |
|---|---|---|---|---|---|---|---|---|
| | Sample code or Product name [mN/m] | | | | | | | |
| Concentrated | 62.31 ± 1.31 | 32.13 ± 0.07 | 23.11 ± 0.13 | 24.10 ± 0.04 | 23.08 ± 0.08 | 23.38 ± 0.15 | 22.03 ± 0.05 | 29.16 ± 0.28 |
| 3.00% | 70.20 ± 0.20 | 55.64 ± 2.16 | 48.67 ± 0.75 | 48.50 ± 1.43 | 45.56 ± 0.35 | 50.94 ± 1.08 | 46.59 ± 0.19 | 49.38 ± 0.28 |

The IFT [mN/m] in table 11 was tested with 40° C. stability sample @124 days. The 0224A formulation at 40° C. was tested IFT at 124 days and the IFT result remain close to that of fresh sample [0224A fresh sample concentrated 23.93+-0.12; 3.00% 48.50+-1.43], which means the surfactant blend survives in 40% active nitric acid.

The surfactant will reduce IFT for both concentrated product and diluted solution, which means the addition of the surfactant in formulations will help the wetting property of the formulation compared products without the ethoxylated fatty alcohol surfactants. The result is consistent to the cleaning performance results.

Example 6

Figure 3:
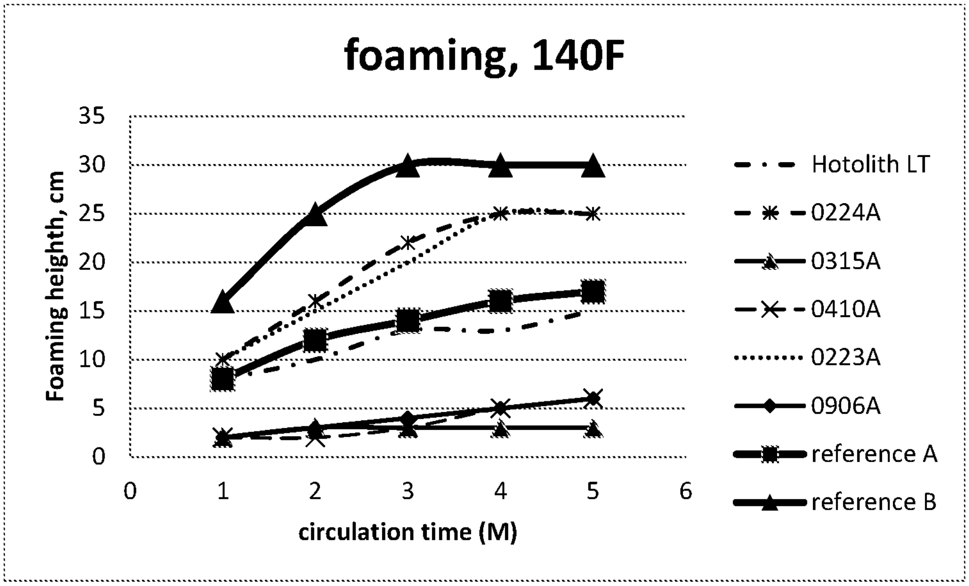
FIG. 3 depicts the foaming height of evaluated acidic cleaning compositions in comparison to commercially-available acidic cleaning compositions.
Figure 4:
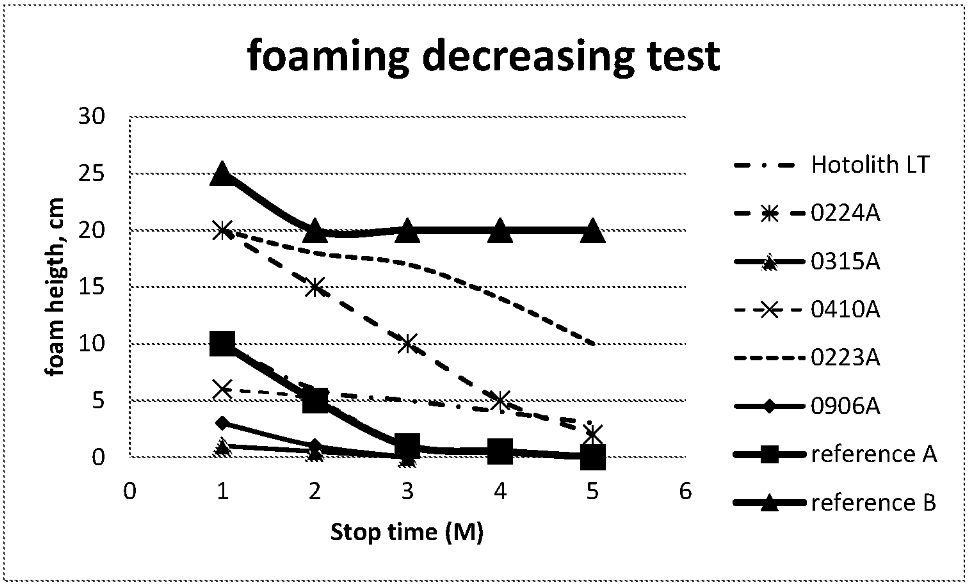
FIG. 4 depicts the foaming height while evaluating a decreasing foam height test over 5 minutes of evaluated acidic cleaning compositions in comparison to commercially-available acidic cleaning compositions.

Foaming testing was also completed. At 1.5% (wt/v) concentration, Circulating for 5 minutes. As shown in FIG. 3 and FIG. 4, Reference A is a commercial control product (Horolith LT; sulfuric/nitric acid formulation; Ecolab Inc.) and Reference B is a commercial control product (Stabicip HH; 30-50% alcohols, C12-16 ethoxylated; Ecolab Inc.). 120 ml to 600 L circulation volume was employed for the foaming test. FIG. 3 shows 0224A foaming and all other evaluated formulations are acceptable.

Thereafter, a foaming decreasing test was completed. After the pump stopped the foam was monitored for 5 minutes. In CIP operations, if foam cannot decrease quickly, foam will build up in CIP tank, which will have negative impact on following CIP. FIG. 4 shows 0224A foam decreasing at a desired rate.

Example 7

Calcium salt precipitation testing was conducted. Reagent grade Calcium phosphate/Calcium stearate was added to the test solution at the 2% concentration. Then Calcium phosphate/Calcium stearate was added in excess so that there was precipitation on the bottom of the beaker. Magnetic agitation to 500 rpm was initiated and the solution was heated to the use temperature (60° C.). The solution was covered to avoid water evaporation and was left for 30 minutes. The magnetic agitation was turned off and the solution left to cool for 1 hour. Supernatant samples were taken with a syringe and filtered through a 0.2 micron filter. The filtrate was analyzed for Calcium with ICP to quantify Calcium in solution.

The results are shown in Table 12.

TABLE 12

| | Formula code/product name | | | | | | | |
|---|---|---|---|---|---|---|---|---|
| | Horolith NP | Horolith LT | 0224 A | 0518 A | 0315 A | 0410 A | 0223 A | 0906 A |
| $Ca_3(PO_4)_2$, as Ca mg/l | 4800 | 4180 | 4600 | 4200 | 4600 | 4600 | 4800 | 4600 |
| Ca stearate, as Ca mg/l | 80 | / | 200 | 540 | 210 | 63 | 510 | 340 |

For $Ca_3(PO_4)_2$ removal, it is more related to nitric acid content in the solution, so all formulas are close. However, for Ca Stearate, the formulas with surfactant show improved removal performance than regular CIP acid cleaner except for 0410A.

It is to be understood that while the invention has been described in conjunction with the detailed description thereof, the foregoing description is intended to illustrate, and not limit the scope of the invention, which is defined by the scope of the appended claims. Other embodiments, advantages, and modifications are within the scope of the following claims. In addition, the contents of all patent publications discussed supra are incorporated in their entirety by this reference.

What is claimed is:

1. An aqueous acidic cleaning composition comprising:

about 40 wt-% to about 90 wt-% of aqueous nitric acid;

about 20 wt-% to about 80 wt-% water; and about 0.01 wt-% to about 1 wt-% of at least two polyethoxylated fatty alcohols having different molecular masses wherein the polyethoxylated fatty alcohol is a blend of two C12-C15 ethoxylated alcohol mixtures with an average of 7-12 moles of ethoxylation, wherein the first polyethoxylated fatty alcohol is a mixture of C12-C14 ethoxylated alcohols with an average of 12 moles ethoxylation, and wherein the second polyethoxylated fatty alcohol is a mixture of C12-C15 ethoxylated alcohols with an average of 7 moles ethoxylation; and optionally about 0.01 wt-% to about 0.5 wt-% nonionic glucamide co-surfactant, and wherein the aqueous acidic cleaning composition is phosphate-free, sulfuric-free, and sulphate free; and wherein the aqueous acidic cleaning composition comprises from about 30% active nitric acid to about 45% active nitric acid.

2. The composition of claim 1, further comprising the nonionic glucamide co-surfactant.

3. The composition of claim 1, further comprising the nonionic glucamide surfactant which is a caprylоyl/capryl methyl glucamide.

4. The composition of claim 1, wherein the ratio of the weight-percentage (wt-%) of the mixture of C12-C14 ethoxylated alcohols with an average of 12 moles of ethoxylation to the actives-percentage (% active) of nitric acid is between about 1:2000 to about 1:200.

5. The composition of claim 1, wherein the composition is in a concentrated form that may be diluted to a use cleaning solution concentration.

6. The composition of claim 1, wherein the composition does not comprise additional surfactants and/or acids.

7. The composition of claim 6, wherein the composition does not comprise alkylpolyglucoside.

8. The composition of claim 4, further comprising at least one additional functional ingredient comprising defoaming agents, anti-redeposition agents, bleaching agents, solubility modifiers, dispersants, rinse aids, metal protecting agents, stabilizing agents, corrosion inhibitors, sequestrants, chelating agents, fragrances, dyes, rheology and/or solubility modifiers, thickeners, hydrotropes, couplers, buffers, or solvents.

9. The composition of claim 1, wherein the composition is phase stable and retains surfactant stability measured by less than 10% change in IFT at temperatures from about 4° C. to about 40° C. for at least about three months.

10. A method of cleaning soils comprising:

applying the cleaning composition of claim 1 to a soiled surface or object; and removing soils from the surface.

11. The method of claim 10, wherein the soils comprise organic soils, fats and/or soap scum, and wherein the surfaces comprise industrial equipment, a clean in place process and/or a clean out of place process.

12. The method of claim 10, wherein the surface or object comprises stainless steel.

13. The method of claim 10, wherein the temperature when applying to the surfaces ranges up to approximately 200 degrees Fahrenheit.

14. The method of claim 10, wherein the cleaning composition is applied in a CIP or COP application.

15. The method of claim 10, wherein the cleaning composition is applied to the surface or object for at least about 10 minutes and provides between about 5000 ppm to about 40,000 ppm total actives of the cleaning composition.

* * * * *